Patented Aug. 25, 1931

1,820,179

UNITED STATES PATENT OFFICE

EDWARD L. IVES, OF CHICAGO, ILLINOIS, ASSIGNOR, BY MESNE ASSIGNMENTS, TO A. M. BYERS COMPANY, OF PITTSBURGH, PENNSYLVANIA, A CORPORATION OF PENNSYLVANIA

METHOD OF PREPARING OR REMELTING WROUGHT IRON SLAG

No Drawing. Application filed July 21, 1928. Serial No. 294,580.

My invention relates to the preparation and remelting of slags to be used in the Aston process, such, for example, as set forth in several United States patents of James Aston, such as No. 1,370,507, granted March 8, 1920, for method of making wrought iron pipe; No. 1,412,823, granted April 18, 1922, for method of making wrought iron; and No. 1,469,373, granted October 2, 1923, for manufacture of wrought iron.

In order to produce a high grade of wrought iron by the Aston process, it is necessary to employ a slag in the shotting or granulating step which is substantially uniform in composition and character, and equal to the best slag obtained in making hand puddled wrought iron. Preserving the uniformity of composition is of great importance, particularly with regard to the iron silicate content. Such slags are ordinarily made by melting a charge of material, such as iron ore, roll scale, puddling cinder, heating cinder, or other iron oxides, with gravel, quartzite, sand, or similar materials.

When these materials were melted down, or a desirable type of slag was re-melted in cupola furnaces, it was found that more or less iron was reduced on account of the presence of solid carbon in the charge. The percentage of reduction varied under the variable factors, such as temperatures in different parts of the cupola, the coarseness of the materials, the quality of coke, the quantity and pressure of blast, moisture of the air, and other conditions which cannot be controlled.

The object of my invention is to overcome this difficulty and enable a high and uniform quality of slag to be produced. In carrying out my improved method, I melt the slag or slag-forming materials containing iron oxides, silica or silicates, in a shaft furnace, such as a cupola, and employ solid fuels, such as coke or pulverized coal, in the process. The melting is carried out in the ordinary manner, air being forced into the crucible or base portion of the cupola or blast furnace type of vertical furnace. Some reduction of iron oxide takes place in this process; but I tap out the liquid slag or transfer it either directly or by means of a ladle into a hearth type of furnace, such as an open hearth furnace, reverberatory furnace, or "air furnace". A liquid slag bath is maintained in this hearth furnace and samples are taken and analyzed. Then additions of iron oxide, silica or other ingredients are made, such as required to produce the desired analysis in the bath. When the bath has been brought to the proper analysis, as shown by physical test or analysis, or both, the slag is then ready for use.

The advantages of my invention result from the cheapness and economy resulting from the use of ordinary shaft furnace practice for melting or liquefying the major portion of the charge by the cheapest method and securing the desired analysis by cold additions, the composition being modified and brought to the desired characteristics in a hearth type of furnace.

Many changes may be made in the type of apparatus used, the exact character of the slag, etc., without departing from my invention.

I claim:

1. In the method of preparing or re-melting slag for wrought iron use, the steps consisting of melting or remelting slag-forming materials in a shaft furnace by solid combustible material in the charge, tapping out the liquid slag into a hearth furnace, and making additions to the charge to bring it to the desired chemical characteristics.

2. In the method of preparing or remelting slag for wrought iron use, the steps consisting of melting or remelting the slag-forming materials in a shaft furnace by solid combustible material in the charge, tapping out the melted slag, feeding it into a hearth furnace, maintaining it in molten condition therein, testing the chemical proportions of the slag constituents, adding iron oxides thereto in such proportions as to maintain uniformity of slag composition of the desired chemical characteristics, feeding successive portions therefrom into receptacles, pouring the molten product of a steel-making operation into the slag baths, and forming welded balls of wrought iron therein.

In testimony whereof I have hereunto set my hand.

EDWARD L. IVES.